(12) United States Patent
Takahashi

(10) Patent No.: US 6,966,278 B2
(45) Date of Patent: Nov. 22, 2005

(54) ELECTRONICALLY CONTROLLED THERMOSTAT

(75) Inventor: Masanori Takahashi, Tokyo (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 0 days.

(21) Appl. No.: 10/484,165

(22) PCT Filed: Mar. 12, 2003

(86) PCT No.: PCT/JP03/02957

§ 371 (c)(1),
(2), (4) Date: Jan. 20, 2004

(87) PCT Pub. No.: WO03/095810

PCT Pub. Date: Nov. 20, 2003

(65) Prior Publication Data

US 2004/0163612 A1     Aug. 26, 2004

(30) Foreign Application Priority Data

May 10, 2002  (JP) ............................. 2002-135080

(51) Int. Cl.[7] ................................................ F01P 7/14
(52) U.S. Cl. ..................................... 123/41.1; 236/34
(58) Field of Search ........................ 123/41.1, 41.08, 123/41.09; 236/34, 34.5

(56) References Cited

U.S. PATENT DOCUMENTS 6,592,046 B2 *  7/2003  Suda ..................... 236/34.5

FOREIGN PATENT DOCUMENTS

| JP | 56-18018 | 2/1981 |
| JP | WO01/83961 | * 11/2001 |
| WO | 01/83961 | 11/2001 |

OTHER PUBLICATIONS

U.S. Appl. No. 10/311,209, filed Dec. 16, 2002, Takahashi.
U.S. Appl. No. 10/484,165, filed Jan. 20, 2004, Takahashi.

* cited by examiner

Primary Examiner—Willis R. Wolfe
Assistant Examiner—Katrina B. Harris
(74) Attorney, Agent, or Firm—Oblon, Spivak, McClelland, Maier & Neustadt, P.C.

(57) ABSTRACT

An electronically controlled thermostat enabling stable valve body actuation, preventing overshooting and hunting, and with reduced size and simplified construction. The thermostat can execute arbitrary variable control of cooling water temperature and includes a thermo-element having a piston actuating opening and closing within a housing of a first valve body and a second valve body to switch the flow path of cooling water by sensing the cooling water temperature and an element guide member holding the thermo-element within the housing. A temperature-sensing chamber is formed by isolation by the element guide member from the flow path in which cooling water on the radiator exit side flows; the temperature-sensing portion of the thermal element is disposed to face this chamber. A linking hole transmits the temperature of cooling water on the radiator exit side from within the flow path to the temperature-sensing portion within the temperature-sensing chamber.

5 Claims, 7 Drawing Sheets

ENGINE ENTRANCE SIDE    ENGINE ENTRANCE SIDE

ENGINE EXIT SIDE (BYPASS PATH)

(a)

(b)

(c)

ELECTRONICALLY CONTROLLED THERMOSTAT

TECHNICAL FIELD

This invention relates to an electronically controlled thermostat used for arbitrary variable control of the cooling water temperature in the cooling system of an internal combustion engine (hereafter simply "engine") used in an automobile, which circulates cooling water to cool the engine between the engine and a heat exchanger (hereafter "radiator").

BACKGROUND ART

In order to cool an automobile engine, generally a water-cooling type cooling system is employed using a radiator. In conventional types of such cooling systems, a thermostat employing a thermally expanding body, or a valve unit under electric control, has been used to adjust the amount of cooling water circulated to the radiator side, in order to enable control of the temperature of the cooling water introduced to the engine.

That is, a thermostat using the above thermally expanding body or a control valve employing a valve unit under electrical control or similar intervenes in a portion of the cooling water path, such as for example on the entrance side or on the exit side of the engine, so that when the cooling water temperature is low, the control valve is closed and the cooling water is circulated through a bypass path without passing through the radiator, and when the cooling water temperature is high, the control valve is opened and the cooling water is circulated through the radiator, so that the temperature of the cooling water can be controlled in a desired state.

For example, the above thermostat may comprise a sensor case incorporating a thermally expanding body, in proximity to the circulating flow path of the cooling system, which detects changes in the temperature of the cooling water to expand and shrink; [the thermostat] has a function to open and close a value through changes in volume accompanying the expanding and shrinking of this thermally expanding body, so that the cooling water is maintained at a prescribed temperature.

An example of a conventional thermostat device appears in FIG. 8. Explained in simple terms, this thermostat device 1A comprises a thermostat actuation portion 30, which is the valve driving portion, within a valve housing 31, 32 comprising two members. This thermostat actuation portion 30 is fixed to the valve housing 32, and causes the first valve body 33 and second valve body 35 (bypass valve) to act through an actuating piston (not shown) mounted within the thermostat actuation portion 30, exercising control to selectively link and block the main path 34 and bypass path 36.

The housing 37 of the thermostat actuation portion 30 is held by a holder 39; this holder 39 surrounds, in cap shape, the end portion [of the housing 37] on the side opposite the side from which the above actuating piston in the housing 37 protrudes. The cap-shape holder 39 is supported by the valve housing 32.

A pot-shape central region is provided in the profile of the first valve body 33, and the thermostat actuation portion 30 is positioned in the center portion thereof. When the first valve body 33 is in the closed position, this central region is in a state which blocks the holder 39 and the main path 34. A bolt 38 is provided in a line extended in the axial direction of the actuating piston, not shown, of the thermostat actuation portion 30; on this bolt 38 is mounted a second valve body 35 (bypass valve) by means of a sliding guide, to open and close a bypass path 36. The second valve body 35 (bypass valve) is impelled by a spring member 41. The first valve body 33 is impelled by the spring member 40, and this spring member 40 is supported by the valve housing 31.

When for example a thermostat device 1A with such a configuration is positioned as an entrance control, cooling water flowing in from the radiator exit side through the sleeve 42 passes through the main path 34 and is supplied in circulation to the engine entrance side from the sleeve 43, or, cooling water from the engine exit side flows in from the bypass path 36, and is supplied in circulation to the engine entrance side from the sleeve 43.

Prior to warmup at the time the engine is started, the cooling water flowing in from the radiator exit is at a low temperature, so that the wax within the housing 37 is in a shrunken state, the first valve body 33 is in a state of blocking the main path 34, and the second valve body 35 (bypass valve) leaves open the bypass path 36. Consequently cooling water flowing in from the bypass path 36 is returned directly to the engine entrance side via the sleeve 43.

After warmup operation, when the cooling water reaches the prescribed temperature, the wax within the housing 37 expands due to this temperature, to extend the actuating piston, not shown, of the thermostat actuation portion 30. Through extension of this actuating piston, the first valve body 33 moves downward against the impelling force of the spring member 40 to change from a state of blocking to a state of opening the main path 34, and in addition the second valve body 35 (bypass valve) blocks the bypass path 36. Hence cooling water which had flowed in from the sleeve 42 passes through the sleeve 43 to flow into the engine entrance portion.

In order to forcibly expand the wax within the housing 37, a construction may be employed in which a heated means 44 is provided within the housing 37, and this heated means 44 is caused to protrude from the valve housing 32 and to make contact with a heating element 45.

In such a conventional thermostat device 1A, the housing 37 which is the cooling water temperature-sensing portion is positioned inside the cooling water path, so that the resistance to flow of cooling water flowing in from the sleeve 42 is increased, and consequently it has been difficult to reduce the size of the water pump which forcibly circulates the cooling water.

Further, during warmup operation at the time the engine is started, cooling water from the engine exit side and cooling water from the radiator exit portion become mixed near the housing 37, so that a hunting phenomenon may occur; when such a phenomenon occurs, the temperature of cooling water flowing into the engine entrance side is unstable, and it becomes difficult to improve fuel efficiency and to quickly warm cooling water. As a means of preventing this [phenomenon], innovations must be made in the construction of the valve housing 32 for mixing of cooling water immediately before the housing 37 which is the temperature-sensing portion, and a current plate, called a baffle, must be installed.

Further, when the thermostat device 1A is positioned for entrance control, cooling water flowing in from the engine may also be detected, so that overshoot and other erroneous operation may occur.

In order to resolve such problems, the applicants[ii] previously devised [the invention of] Japanese Patent Laid-open No. 2001-317355 and similar; this preceding example has a construction in which a thermoelement temperature-sensing portion to actuate a main shaft controlling the opening and closing of a first valve body and a second valve body is positioned in contact only with cooling water from the engine exit side to sense temperature, without making direct contact with the cooling water from the radiator exit side; Further, a heat-generating element is mounted in the temperature-sensing portion, and the opening and closing of the first valve body and second valve body are controlled through control of heat generation by this heat-generating element as well.

When such a configuration is adopted, because the thermo-element is not positioned within the housing, resistance to the flow of cooling water within the housing can be reduced; and there are also such advantages as structural improvement of the valve housing for mixing of cooling water immediately before the housing and elimination of the need to install a current plate.

In such a thermostat device, through configuration as an electronically controlled thermostat in which, by controlling actuation of the above heat-generating element according to the various running conditions of the automobile, the engine cooling water temperature can be arbitrarily variably controlled, there is the following problem.

To explain this problem, in the above-described preceding device example the thermo-element is covered with a resin member, relying on the thermal insulation effect in order that there is no influence by the temperature of cooling water from the radiator, which may impact the performance of variable control of the cooling water temperature under electronic control. But in such a configuration, even when the cooling water temperature on the radiator exit side is extremely low, the valve may remain open without sensing this [temperature], so that more cold cooling water than necessary is supplied to the engine, raising concerns of damage to the engine and possible mission failure.

In order to eliminate such problems, a temperature sensor capable of detecting the temperature of cooling water from the radiator exit side may be provided, and electronic control performed with the detected value as a parameter; but this results in an increased number of components and higher costs.

The present invention was devised in light of these circumstances, and has as an object the obtaining of an electronically controlled thermostat enabling prompt warming of cooling water even at the time the engine is started, enabling improved fuel efficiency and reduced resistance to the flow of cooling water, in addition to appropriate and reliable operation according to operating conditions, including the temperature of cooling water from the radiator exit side, and which is simple in construction and inexpensive.

DISCLOSURE OF THE INVENTION

In order to achieve this object, an electronically controlled thermostat of this invention (of Claim 1 of this invention) is an electronically controlled thermostat used in systems to control the temperature of engine cooling water for arbitrary variable control of the cooling water temperature according to the engine state, comprising a thermo-element having a piston which actuates opening and closing within a housing of a first valve body and a second valve body, to perform switching of the flow path of cooling water by sensing the cooling water temperature; an element guide member which holds the thermo-element within the above housing; and a temperature-sensing chamber, formed through isolation by the element guide member from the path of flow of cooling water on the radiator exit side within the above housing, and positioned with the element temperature-sensing portion facing [the chamber]; and characterized in the additional provision of heat transmission means to transmit the temperature of cooling water in the radiator exit side from within the above flow path to the element temperature-sensing portion within the temperature-sensing chamber.

An electronically controlled thermostat of this invention (of the invention of Claim 2) is the electronically controlled thermostat of Claim 1, characterized in that, as the above heat transmission means, a cooling water flow portion is provided, formed by opening a hole in, or cutting a portion from, the element guide member.

An electronically controlled thermostat of this invention (of the invention of Claim 3) is the electronically controlled thermostat of Claim $1^{iii}$, characterized in that as the above heat transmission means, the element guide member is formed from material with excellent heat transmission properties.

An electronically controlled thermostat of this invention (of the invention of Claim 4) is the electronically controlled thermostat of Claim 1, Claim 2 or Claim 3, characterized in that a heat-generating element controlled from outside is mounted on the above element temperature-sensing portion.

By means of this invention, heat transmission means to directly or indirectly transmit the cooling water temperature on the radiator exit side is provided in the element temperature-sensing portion within the temperature-sensing chamber formed by isolation from the path in which cooling water flows on the radiator exit side within the housing; hence in variable control of cooling water flow and flow amount, the sensor and control portion which had been necessary to detect the radiator exit side temperature are rendered unnecessary, the cooling water temperature on the radiator exit side can be appropriately and reliably sensed by the thermo-element temperature-sensing portion, and this condition can be reflected in the thermo-element operation. Hence variable temperature control of cooling water can be performed by the electronically controlled thermostat, and by adopting this configuration the construction can be simplified and costs can be reduced.

BEST MODE FOR CARRYING OUT THE INVENTION

Figure 1:
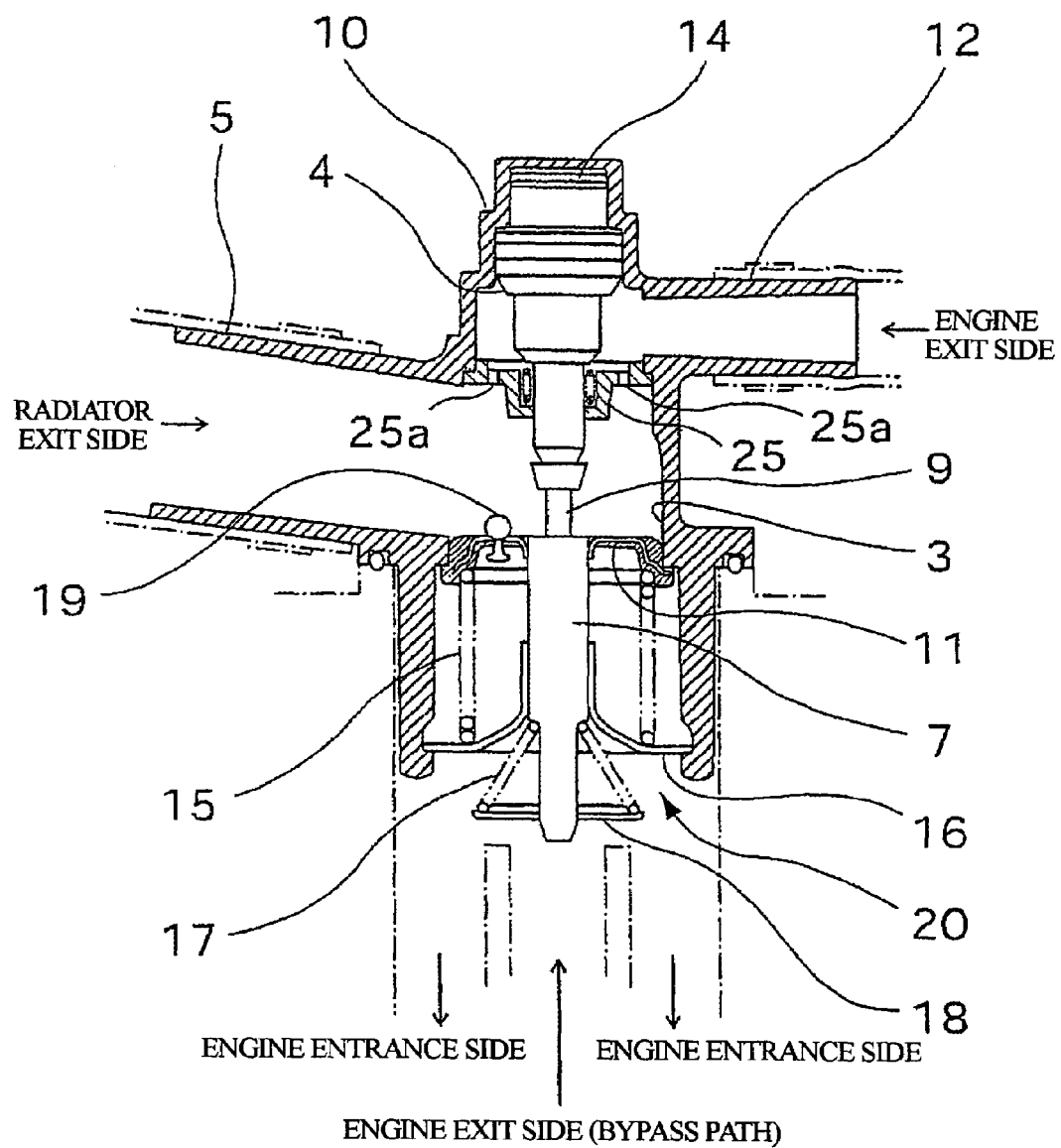
FIG. 1 is a vertical cross-sectional view showing the form of a first aspect of an electronically controlled thermostat of this invention, and showing in cross-section the principal components (line I—I in FIG. 5)
Figure 2:
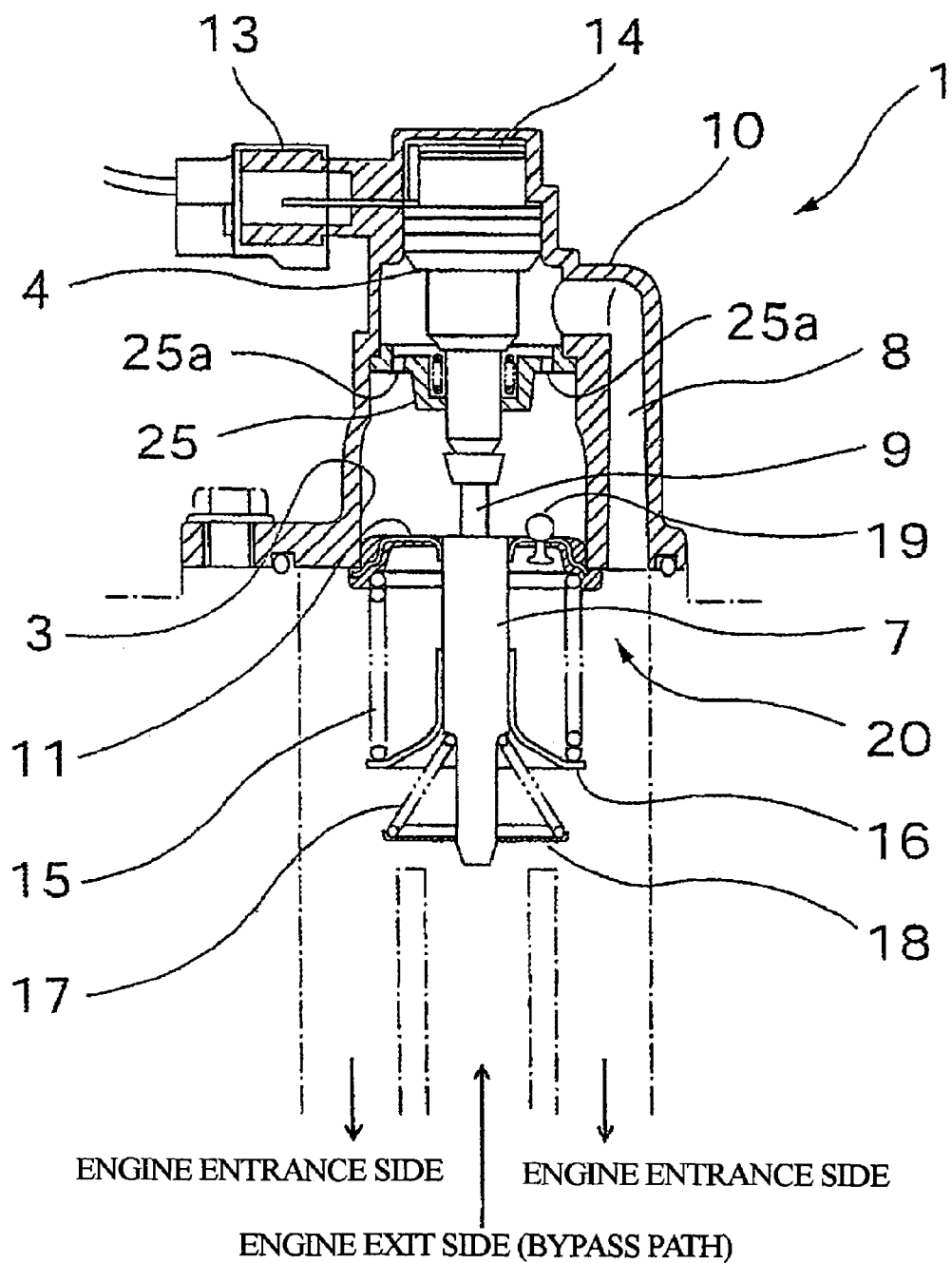
FIG. 2 is a vertical cross-sectional view showing in cross-section a position different from FIG. 1 (line II—II in FIG. 5)

FIG. 1 through FIG. 5 show a first aspect of an electronically controlled thermostat of this invention. In these drawings, the electronically controlled thermostat of the first aspect comprises a housing 10 for the main unit, formed integrally from a heat-resistant plastic or other resin material, and a valve driving portion 20, mounted within the element 4, which opens and closes the main valve body (first valve body) and bottom-side bypass valve body (second valve body) through expansion of wax, not shown, which is the portion which senses the temperature of the cooling liquid. Here, the housing 10 and valve driving portion 20 are each explained in detail.

(1) Regarding the Housing 10

The housing 10 of the electronically controlled thermostat is injection-molded using a heat-resistant plastic or other resin material so as to adequately withstand the temperatures of cooling water heated as described above. Depending on the application, metal material can also be used.

In the housing 10 are formed a bypass sleeve 12 for direct inflow to the thermostat device 1 of cooling water on the engine exit side when the engine is started; a main sleeve 5 for inflow of cooling water to the thermostat device 1 from the radiator exit side after warmup operation of the engine; a sub-flow path 8 for outflow to the engine of cooling water which had flown in from the bypass sleeve 12 and made contact with a portion of the temperature-sensing portion of the element 4; and a main flow path (see FIG. 2) for the outflow of cooling water from the radiator exit side to the engine entrance side.

Within this housing 10, an inverted concave-shape element storage portion is formed to enable holding of the element 4 itself, positioned such that cooling water on the engine exit side flowing in via the bypass sleeve 12 contacts only a portion of the temperature-sensing portion of the element 4. This portion becomes the temperature-sensing chamber in which the element temperature-sensing portion is positioned. Further, a connector connection portion 13 is formed on the outside of the housing 10 in order to supply power to the heat-generating element 14 which forcibly heats the element 4.

(2) Regarding the Valve Driving Portion 20

The valve driving portion 20 comprises a mechanism element 4 which extends the piston 9 through the expansion of internally mounted wax, upon sensing the temperature of cooling water on the engine exit side, a main shaft 7 connected to the tip portion of the piston 9, a main valve body 11 which is a first valve body removably supported by the main shaft 7, and a bypass valve body 18 which is a second valve body.

A disc-shaped frame 16 is fixed between the main valve body 11 of the main shaft 7 and the bypass valve body 18; in addition, a main spring 15 which impels the main valve body 11 is fixed between the frame 16 and the main valve body 11.

A bypass spring 17 which impels the bypass valve body 18 is fixed in a position below the frame 16 of the main shaft 7.

Further, a jiggle valve 19 is positioned in an appropriate position of the main valve body 11, serving the purpose of removing air during injection of cooling water.

The heat-generating element 14 is installed in the top portion of the element 4, at a location not in contact with the cooling water; by applying [a current]$^{iv}$ to this heat-generating element 4$^v$, the heat-generating element 14 generates heat, and heat can be generated independently of the element 4; as a result, the valve driving portion 20 can be controlled, and through the output of a signal from an ECU, not shown, according to the operating state of the engine, it is possible for example to quickly open [the valve] when the engine load increases and the cooling water temperature rises, or to increase the lift amount more than normal to cool the engine, or to otherwise control the engine itself.

As the heat-generating element 4, a nichrome heater, PTC element, Peltier element or similar may be used, and the element can be selected according to the application. In particular, when using a Peltier element an action opposite the above-described effect, that is, cooling of the element becomes possible, so that the range of control of the thermostat can be broadened.

(3) Regarding the Element Guide Member 25 of the Element 4

The element 4 which extends and retracts the piston 9 is held within the housing 10 by an element guide member 25, provided at a position which isolates the temperature-sensing chamber, which the temperature-sensing portion of the element 4 faces and into which cooling water is introduced from the bypass sleeve 12 on the engine exit side, from the main flow path 3. This element guide member 25 comprises a flange for mounting onto the housing 10 and a sleeve portion covering the body portion of the element 4, and is designed such that the temperature of cooling water from the radiator exit side, introduced into the main flow path 3, does not have an excessive thermal effect on the element 4.

That is, if the element 4 is completely covered and thermally insulated by this element guide member 25, configured such that the cooling water temperature on the radiator exit side has no effect, then in a state in which this temperature is extremely low and the cooling water temperature on the engine entrance side is high, a problem occurs for example immediately after warming operation ends; hence by improving the construction of this element guide member 25, the effect of the cooling water temperature on the radiator exit side can be made to act appropriately on the temperature-sensing portion of the element 4, and by means of this temperature sensing the temperature on the radiator exit side can be reflected in control of the cooling water temperature.

By this means, variable control of the cooling water temperature by the thermostat 1 is possible, and control [to maintain] a state which takes into consideration the cooling water temperature on the radiator exit side as well is possible; moreover, this control can be performed without providing a special water temperature sensor or control portion.

Figure 3:
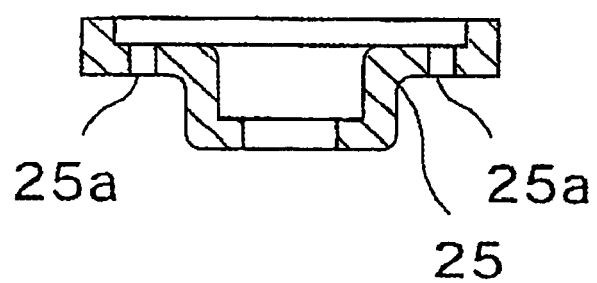
FIG. 3 shows an element guide member which is a characteristic of this invention, wherein (a) is a cross-sectional view of principal components, (b) is a bottom view of same, and (c) shows a modified example of same.
Figure 3:
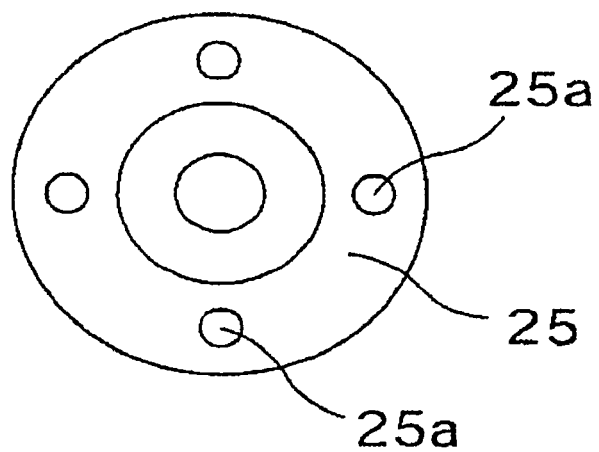
Figure 3:
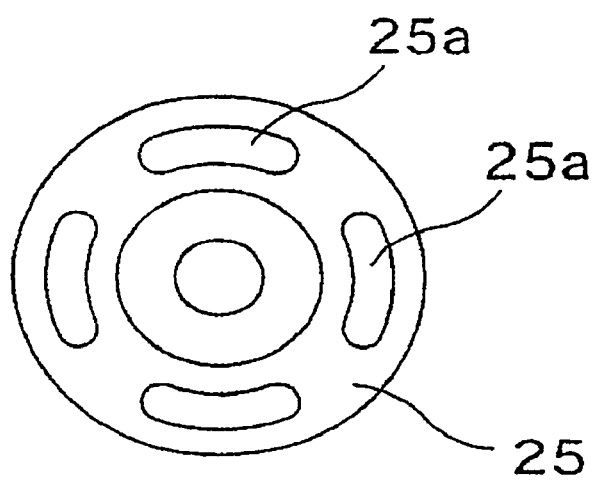
Figure 4:
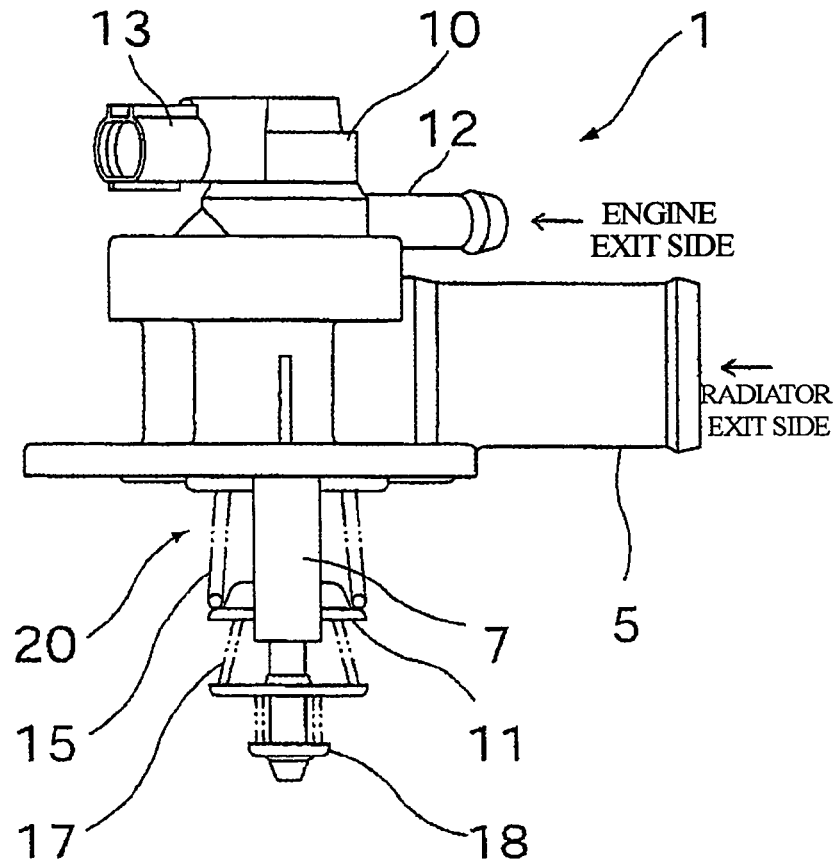
FIG. 4 is a summary side view showing the first aspect of a thermostat device of this invention.
Figure 5:
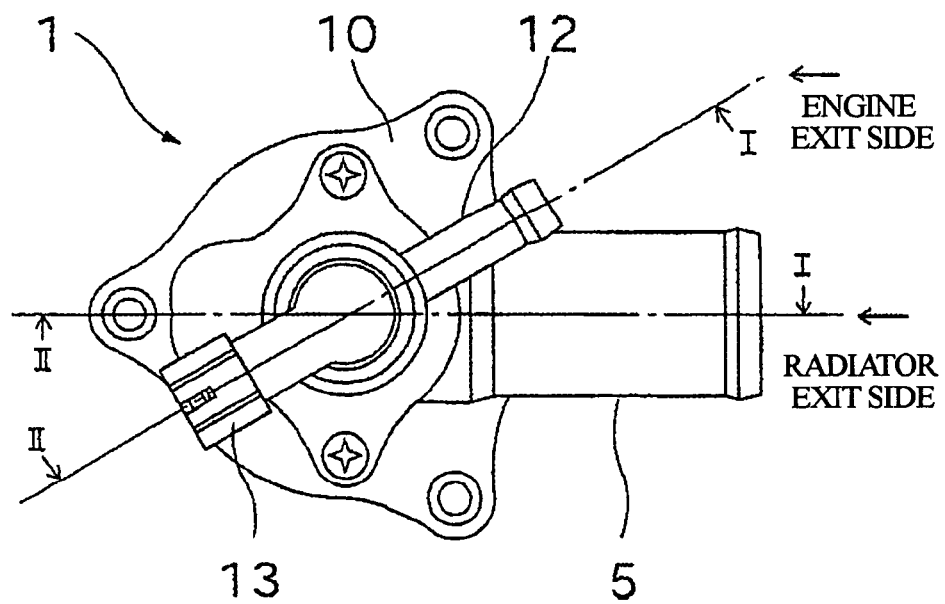
FIG. 5 is a summary plane view of the thermostat device of FIG. 4.

As the element guide member 25, as shown in (a) and (b) of FIG. 3, by opening a plurality of linking holes 25a in the flange for mounting to the housing 10, cooling water from the radiator exit side can be introduced in appropriate amounts to the temperature-sensing portion of the element 4. Further, the linking holes 25a may be long grooves such as in (c) of FIG. 3, and other modified examples, such as for example providing gap paths between the flange of the guide member 25 and the housing 10, are conceivable.

The length of the sleeve holding the body portion of the element 4 may be shortened appropriately to enable temperature sensing at the temperature-sensing portion of the effect of transmitted heat; and, the element guide member 25 may be formed from a metal material with excellent heat conduction properties to enable temperature sensing at the temperature-sensing portion.

In essence, a configuration may be adopted which is appropriate for moderate action on the temperature-sensing portion of the element 4 by the cooling water temperature on the radiator exit side.

(4) Action of the Electronically Controlled Thermostat 1

During engine startup or at other times when the cooling water is cold, the cooling water flowing out from the engine exit side flows into the thermostat 1 from the bypass sleeve 12 of the housing 10 of the electronically controlled thermostat 1. Cooling water which has flowed into the thermostat 1 makes contact with the temperature-sensing portion of the element 4, and then flows directly into the engine via the sub-flow path 8.

On the other hand, cooling water which has flowed out from the engine exit side also flows into the radiator, but cooling water from the radiator also flows into the interior of the thermostat 1 from the main sleeve 5.

However, the main flow path 3 is blocked by the main valve body 11 impelled by the impelling force of the main spring 15, so that cooling water from the radiator cannot flow out to the engine.

Such a state continues, and cooling water not passing through the radiator is quickly warmed. When the cooling water reaches a prescribed temperature, the water temperature of this cooling water is sensed by the wax of the element 4, which gradually expands. As this wax expands the piston 9 is extended, and the main shaft 7 connected via the piston 9 is also extended.

When the main shaft 7 is extended, the main valve body 11 removably supported by this main shaft 7 moves downward against the impelling force of the main spring 15 to open the main path 3 which had been in the blocked state, and cooling water from the radiator flows out to the engine entrance side.

On the other hand, the bypass valve body 18 which is removably supported by the end portion of the main shaft 4 blocks the bypass flow path as the main shaft 7 is extended. A portion of the cooling water from the engine via the bypass sleeve 12 continues to flow in for the purpose of temperature sensing by the thermo-element.

In the above-described action of the thermostat 1, when the temperature of cooling water from the radiator exit side is in a low state, this state is sensed by the temperature-sensing portion through the linking holes 25a provided in the element guide member 25 and through other heat transmission means, and consequently the thermally expanding body within the element 4 shrinks, and the valve body is controlled appropriately. Hence there is no longer a problem in which cooling water on the radiator exit side is at a lower temperature than necessary.

Figure 6:
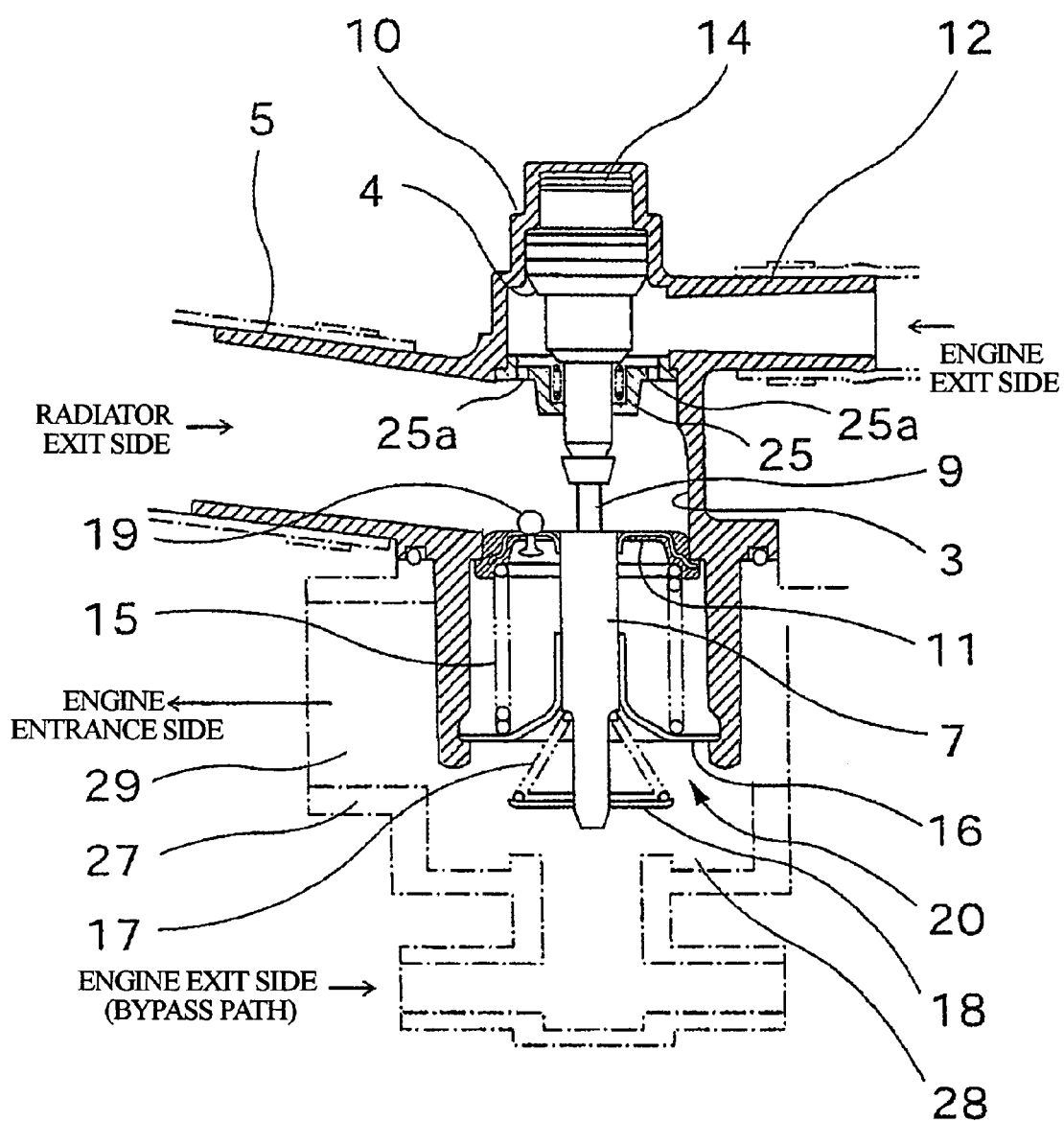
FIG. 6 is a vertical cross-sectional view corresponding to FIG. 1, and shows a second aspect of a thermostat device of this invention.
Figure 7:
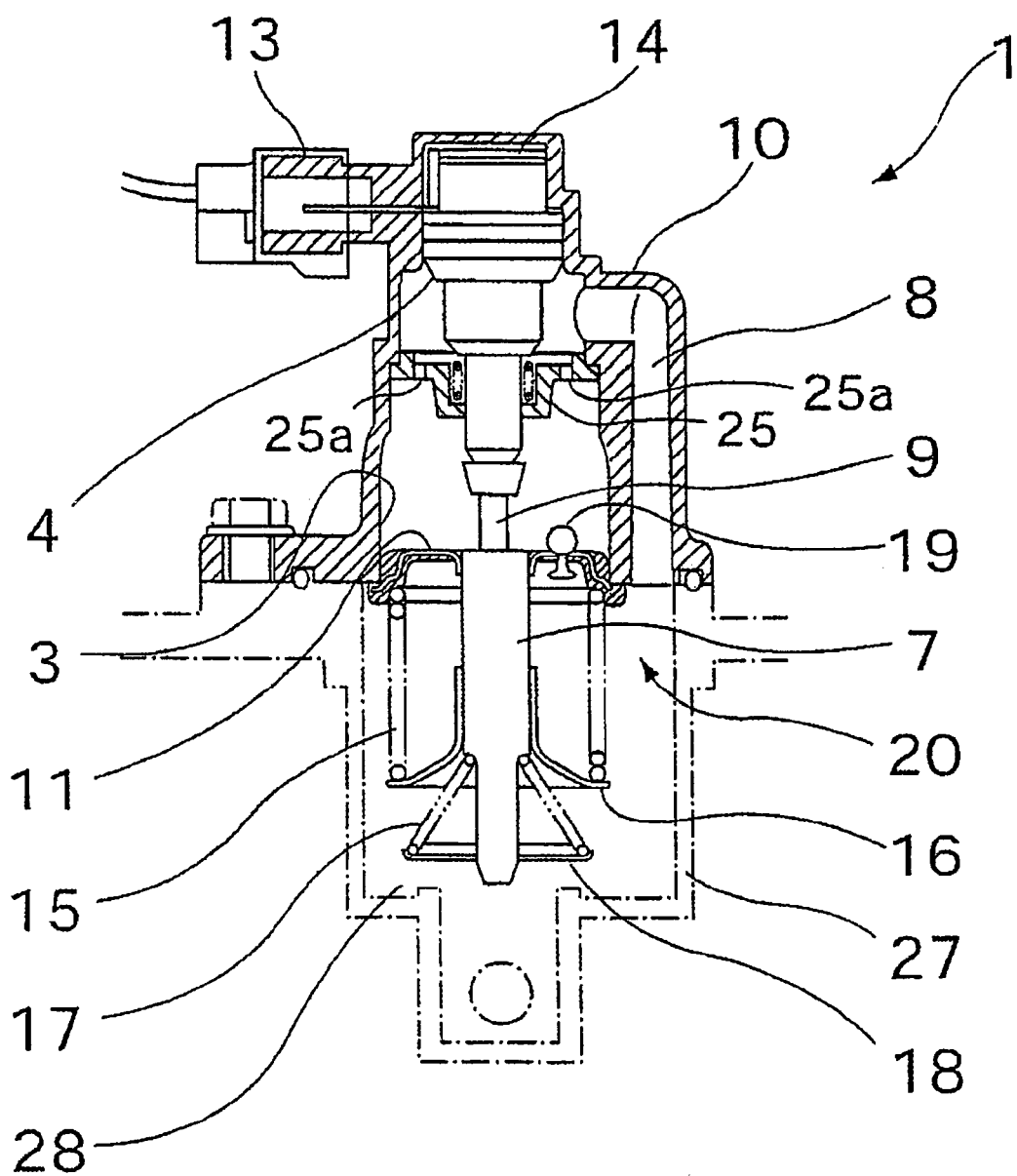
FIG. 7 is a vertical cross-sectional view corresponding to FIG. 2, and shows the second aspect; and, FIG. 8 is a cross-sectional view of a poppet-type thermostat device having a conventional bypass construction.
Figure 8:
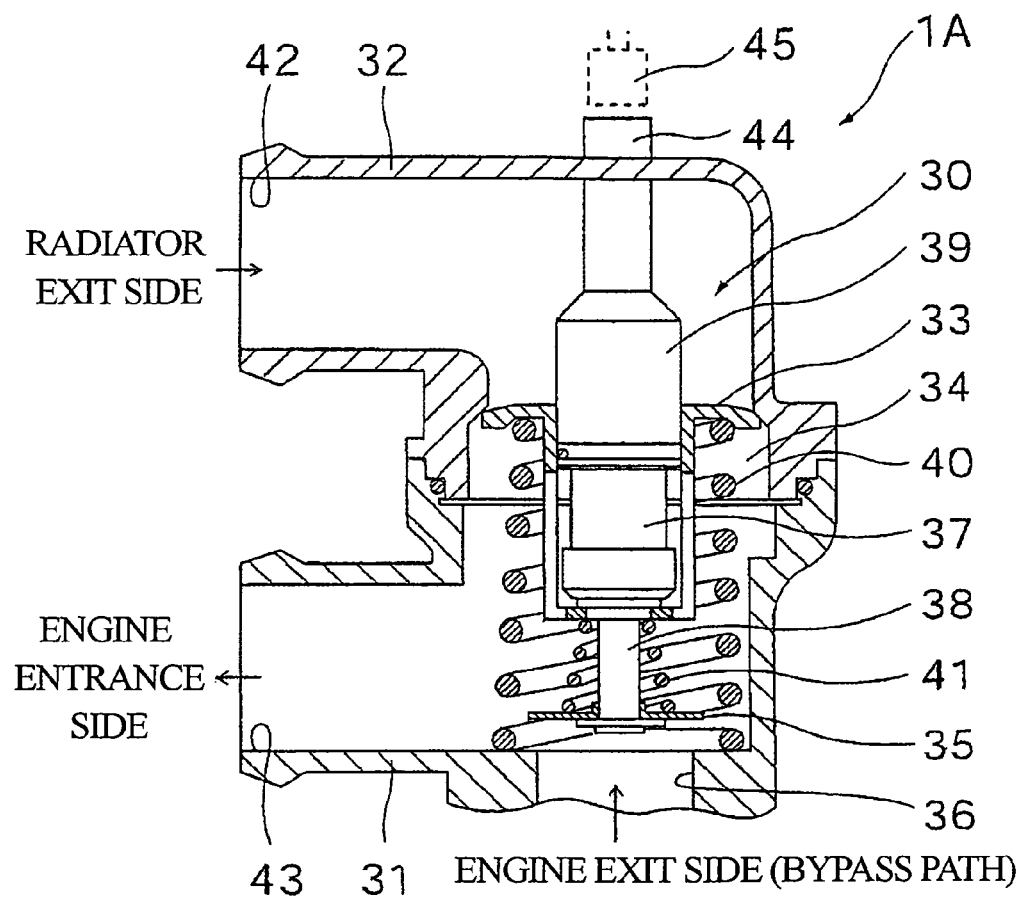

FIG. 6 and FIG. 7 show a second aspect of this invention.

In this second aspect, a second housing 27 separate from the housing 10 is provided in the lower portion, and this housing 27 has a construction in which are formed a mixing chamber 28 which mixes the above cooling water from the engine exit side, or which mixes the above cooling water from the engine side and the above cooling water from the radiator, and a main flow path 29 flowing out from the above mixing chamber 28 to the cooling water main path [and thence] to the engine interior. The internal construction of the device is simplified, and the entirety of the device is unified; however, other configurations are possible as explained in the above aspect, and here a detailed explanation is omitted.

This invention is not limited to the constructions explained in the above aspects, and the shapes of various portions, construction and similar of the electronically controlled thermostat 1 can of course be varied and modified as appropriate. For example, the means of causing the temperature of cooling water from the radiator exit side to be appropriately transmitted to the temperature-sensing portion of the thermo-element 4 is not limited to the above-described examples, and other suitable methods are conceivable. In essence, it is sufficient to provide [means] appropriate to the relation between the placement position of the thermo-element 4 and the flow path in which cooling water from the radiator exit side flows.

INDUSTRIAL APPLICABILITY

As explained above, by means of an electronically controlled thermostat of this invention, heat transmission means to convey, directly or indirectly, the temperature of cooling water on the radiator exit side are provided in the element temperature-sensing portion within a temperature-sensing chamber formed by isolation from the flow path in which flows cooling water on the radiator exit side within the housing. Hence in variable control of the flow and flow amount of cooling water, the sensor or control portion which had been necessary to detect the temperature on the radiator exit side are no longer required, the temperature of cooling water on the radiator exit side can be sensed appropriately and reliably by the temperature-sensing portion of a thermo-element, and this condition can be reflected in the action of the thermo-element.

Consequently by means of this invention, variable temperature control of cooling water can be performed appropriately and reliably by the electronically controlled thermostat, and in addition there are the advantages that the [thermostat] construction can be simplified, and costs can be reduced.

What is claimed is:

1. An electronically controlled thermostat, comprising:
   a housing having a first sleeve configured to receive a coolant from an engine, a second sleeve configured to receive the coolant from a radiator, a first flow path configured to outflow the coolant from the radiator to the engine, and a second flow path configured to outflow the coolant from the first sleeve to the engine;
   a first valve positioned to open and close the first flow path;
   a second valve positioned to open and close a third flow path from the engine;
   a shaft configured to support the first and second valves;
   an element guide member including at least one hole mounted inside of the housing; and
   a thermo-element including a piston connected to the shaft and a temperature-sensing portion held by the element guide member so that the temperature-sensing portion is positioned in the first sleeve, said thermo-element configured to sense a temperature of the coolant and to retract and extend the piston based on the sensed temperature of the coolant to control an opening and closing of the first and second valves,
   wherein the element guide member is formed from material with excellent heat conduction properties.

2. The electronically controlled thermostat according to claim 1, further comprising:
   a heat-generating element configured to heat the thermo-element mounted on the thermo-element.

3. The electronically controlled thermostat according to claim 1, wherein said at least one hole is a groove-shaped hole.

4. The electronically controlled thermostat according to claim 1, wherein a length of a sleeve portion of the element guide member is varied to allow sensing of an effect of transmitted heat at the temperature-sensing portion.

5. An electronically controlled thermostat, comprising:
- a housing having a first sleeve configured to receive a coolant from an engine, a second sleeve configured to receive the coolant from a radiator, a first flow path configured to outflow the coolant from the radiator to the engine, and a second flow path configured to outflow the coolant from the first sleeve to the engine;
- a first valve positioned to open and close the first flow path;
- a second valve positioned to open and close a third flow path from the engine;
- a shaft configured to support the first and second valves;
- an element guide member including at least one hole mounted inside of the housing; and
- a thermo-element including a piston connected to the shaft and a temperature-sensing portion held by the element guide member so that the temperature-sensing portion is positioned in the first sleeve, said thermo-element configured to sense a temperature of the coolant and to retract and extend the piston based on the sensed temperature of the coolant to control an opening and closing of the first and second valves,
- wherein said first sleeve communicates with said second sleeve through said at least one hole.

* * * * *